United States Patent
Park et al.

(10) Patent No.: US 7,646,438 B2
(45) Date of Patent: Jan. 12, 2010

(54) MICRO LENS PANEL UNIT FOR THREE-DIMENSIONAL DISPLAY, THREE-DIMENSIONAL DISPLAY DEVICE, AND MANUFACTURING METHOD THEREOF

(75) Inventors: Won-Sang Park, Gyeonggi-do (KR); Kee-Han Uh, Gyeonggi-do (KR); Hae-Young Yun, Gyeonggi-do (KR); Jae-Hyun Kim, Gyeonggi-do (KR); Jae-Young Lee, Seoul (KR); Young-Joo Chang, Gyeonggi-do (KR); Poundaleva Irina, Gyeonggi-do (KR); Sung-Eun Cha, Gyeongsangnam-do (KR); Seung-Kyu Lee, Gyeonggi-do (KR); Jae-Ik Lim, Gangwon-do (KR); Sang-Woo Kim, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 203 days.

(21) Appl. No.: 11/298,364

(22) Filed: Dec. 8, 2005

(65) Prior Publication Data

US 2006/0125977 A1    Jun. 15, 2006

(30) Foreign Application Priority Data

Dec. 10, 2004    (KR)    ............... 10-2004-0104437

(51) Int. Cl.
    *G02F 1/1335*    (2006.01)
(52) U.S. Cl. .......................... 349/15; 349/95
(58) Field of Classification Search .............. 349/15, 349/95, 57, 201
    See application file for complete search history.

(56) References Cited

U.S. PATENT DOCUMENTS

| 4,717,949 | A |   | 1/1988 | Eichenlaub |
| 5,148,302 | A | * | 9/1992 | Nagano et al. ............... 349/201 |
| 5,299,289 | A | * | 3/1994 | Omae et al. .................. 349/201 |
| 5,505,804 | A | * | 4/1996 | Mizuguchi et al. ........... 156/154 |
| 5,666,175 | A | * | 9/1997 | Spitzer et al. .................. 349/95 |
| 6,046,849 | A |   | 4/2000 | Moseley |
| 6,055,013 | A |   | 4/2000 | Woodgate |
| 6,061,083 | A |   | 5/2000 | Aritake |
| 6,069,650 | A |   | 5/2000 | Battersby |
| 6,157,424 | A |   | 12/2000 | Eichenlaub |
| 6,437,915 | B2 |   | 8/2002 | Moseley |
| 6,606,135 | B2 | * | 8/2003 | Nakanishi et al. ............. 349/95 |
| 6,703,989 | B1 |   | 3/2004 | Harrold |
| 2002/0085287 | A1 |   | 7/2002 | Egawa |
| 2002/0180659 | A1 |   | 12/2002 | Takahashi |
| 2003/0011884 | A1 |   | 1/2003 | Van Burkel |
| 2003/0085850 | A1 |   | 5/2003 | Feenstra |
| 2003/0112523 | A1 |   | 6/2003 | Daniell |
| 2004/0240777 | A1 | * | 12/2004 | Woodgate et al. ............. 385/16 |

FOREIGN PATENT DOCUMENTS

CN    1539095 A    10/2004

(Continued)

*Primary Examiner*—James A Dudek
(74) *Attorney, Agent, or Firm*—Cantor Colburn LLP

(57) ABSTRACT

A micro lens panel unit for 3D display device includes: a first panel; a resin lens formed on the first panel and having a convex shape; a second panel facing the first panel; and a liquid crystal interposed between the first and second panels.

13 Claims, 6 Drawing Sheets

FOREIGN PATENT DOCUMENTS

| | | |
|---|---|---|
| JP | 2001086533 | 3/2001 |
| JP | 2002148561 | 5/2002 |
| JP | 2004085924 | 3/2004 |
| KR | 1019990053445 | 7/1999 |
| KR | 1020030088244 | 11/2003 |
| KR | 1020040033365 | 4/2004 |
| KR | 1020040036725 | 4/2004 |
| KR | 1020040051599 | 6/2004 |
| KR | 1020030077357 | 10/2007 |
| WO | 03015424 | 2/2003 |

\* cited by examiner

MICRO LENS PANEL UNIT FOR THREE-DIMENSIONAL DISPLAY, THREE-DIMENSIONAL DISPLAY DEVICE, AND MANUFACTURING METHOD THEREOF

BACKGROUND OF THE INVENTION (a) Field of the Invention

The present invention relates to a micro lens panel unit for a three-dimensional display device, a three-dimensional display device, and a manufacturing method thereof.

(b) Description of Related Art

Nowadays, services which will realize acceleration of information transport on the basis of the information superhighway are gradually being advanced. Examples include a service such as for telephones for simply listening and speaking, and a multimedia-type service for seeing and listening using a digital terminal unit processing characters, voice, and image at a high speed. Moreover, such services are expected to eventually advance toward a three-dimensional information communication service for watching, feeling, and enjoying, transcending time and space.

Generally, three-dimensional (3D) images are formed by a principle of stereo eyesight via two human eyes, i.e., a parallax of two eyes occurs since the two eyes exist at a distance of approximately 65 mm apart, and the parallax of two eyes is a main factor for 3D sensing. That is, two eyes look at two different two-dimensional (2D) images for transmittance to the brain via the retinas, and the brain synthesizes the two images with each other to reproduce depth and reality of the real image. Such capability is commonly called strereography.

A 3D image display device uses the parallax of two eyes, and is classified as a stereoscopic type and an auto-stereoscopic type depending on a type of glasses used. The stereoscopic type includes a polarizing type and a time-divisional type, and the auto-stereoscopic type includes a parallax-barrier type, a lenticular type, a micro lens type, and a blinking light type.

For the former, many people can enjoy the 3D image but separate polarizing glasses or glasses with a liquid crystal-shutter must be used, and for the latter, only a small number of people can enjoy the 3D image since the 3D display device is provided with equipment such as an image splitter, a micro lens corresponding to a cylindrical lens array, and a configuration combining a parallax-barrier, thereby fixing a viewing range, but the latter is preferable due to no need to use separate glasses. That is, the stereoscopic 3D image display device forces users to put on glasses and thus they have trouble in viewing. On the contrary, an auto-stereoscopic 3D image display device allows users to enjoy 3D images by simply looking at them.

The auto-stereoscopic 3D image display device displays the 3D image by arranging a 3D image formation apparatus on a display panel. 3D image formation apparatuses include a micro lens and a parallax barrier. The 3D image formation apparatus may be provided with a conversion means using combination or addition in order to display 2D image as well as the 3D image. For example, addition of a switching unit and a micro lens having refracting anisotropy (referring to WO patent No. 03/015424-A2), or a combination of a switching unit and a retarder (referring to U.S. Pat. Nos. 6,046,849, 6,055,013, 6,437,915), or a combination of a switching unit and a polarizer provided with slits (referring to U.S. Pat. Nos. 4,717,949, 6,157,424) may make the 3D image formation apparatus that is capable of converting the 2D image and 3D image reciprocally.

3D image display devices using a micro lens have been widely developed in consideration of thickness and aperture of the display devices. That is, use of the micro lens causes the thickness of the display device to be thin and increases the aperture.

The 3D image display device using the micro lens typically includes a display panel, a micro lens panel, and a switching unit. The micro lens panel is the most important portion thereof, and as the micro lens panel is manufactured delicately, the 3D image display device display 3D image clearly.

However, the micro lens formed on the micro lens panel has many problems at the time of manufacture.

The micro lens is formed, after forming a frame having a shape of a concave lens using a resin on a substrate such as a glass, liquid crystal is injected into the shape of the concave lens, and then another substrate is attached to the substrate with the lenses and the liquid crystal sealed therebetween.

In this case, the frame with a concave lens shape made of the resin has pitches formed between the concave lens, but the pitches are not sharp but rather are smooth. The smooth pitches are a cause of deterioration of display quality for the 3D image.

SUMMARY OF THE INVENTION

The present invention is directed to solving such conventional problems.

A micro lens panel unit for 3D display device is provided, which includes: a first panel; a resin lenses formed on the first panel and having a convex shape; a second panel facing the first panel; and liquid crystal interposed between the first and second panels.

The resin lenses may substantially extend in a column direction and be disposed parallel to each other in a row direction, and they are preferably shaped as pillars with a curved surface such as a cylindrical pillar and an oval pillar that are sectioned along a perpendicular direction thereof, and sectional surfaces of the resin lenses are attached to the first panel.

A position at which the pillar with a curved surface is sectioned along the perpendicular direction may be a center of the pillars or a position at a distance exceeding 0 and less than half the radius of the pillar.

A 3D display device is provided, which includes: a display panel unit; and a micro lens panel unit comprising a first panel, resin lenses formed on the first panel and having a convex shape, a second panel facing the first panel, and liquid crystal interposed between the first and second panels.

The resin lenses may substantially extend in a column direction and be disposed parallel to each other in a row direction, and preferably are shaped as pillars with a curved surface such as cylindrical pillars and oval pillars that are sectioned along a perpendicular direction thereof, and sectional surfaces of the resin lenses are preferably attached to the first panel.

A position at which the pillars with a curved surface are sectioned along the perpendicular may be a center of the pillars or a position at a distance exceeding 0 and less than half the radius of the pillar.

The display panel unit may include a plurality of pixels arranged in a matrix, and two pixel columns may be arranged for each resin lens.

The 3D display device may further include a backlight unit providing light for the pixels, wherein light from a pixel disposed at the left of the resin lens directs toward a left eye and light from a pixel disposed at the right of the resin lens directs toward a right eye.

A manufacturing method of a micro lens panel unit for 3D display device is provided, which includes: forming a plurality of resin lenses each having a convex shape on an upper panel using resin; attaching a lower panel to the upper panel using a sealant; injecting a liquid crystal between the two panels; and sealing the two panels.

Each of the resin lenses may substantially extend in a column direction and be disposed parallel to each other in a row direction, and are shaped as pillars with a curved surface such as cylindrical pillars and oval pillars that are sectioned along a perpendicular direction thereof, and sectional surfaces of the resin lenses are attached to the upper panel.

A position at which the pillars with a curved surface are sectioned along the perpendicular direction may be a center of the pillars or a position at a distance exceeding 0 and less than half the radius of the pillar.

The sealant preferably has an injection hole for injecting the liquid crystal.

BRIEF DESCRIPTION OF THE DRAWINGS

The present invention will become more apparent by describing preferred embodiments thereof in detail with reference to the accompanying drawings, in which.

DETAILED DESCRIPTION OF EMBODIMENTS

Figure 1A:
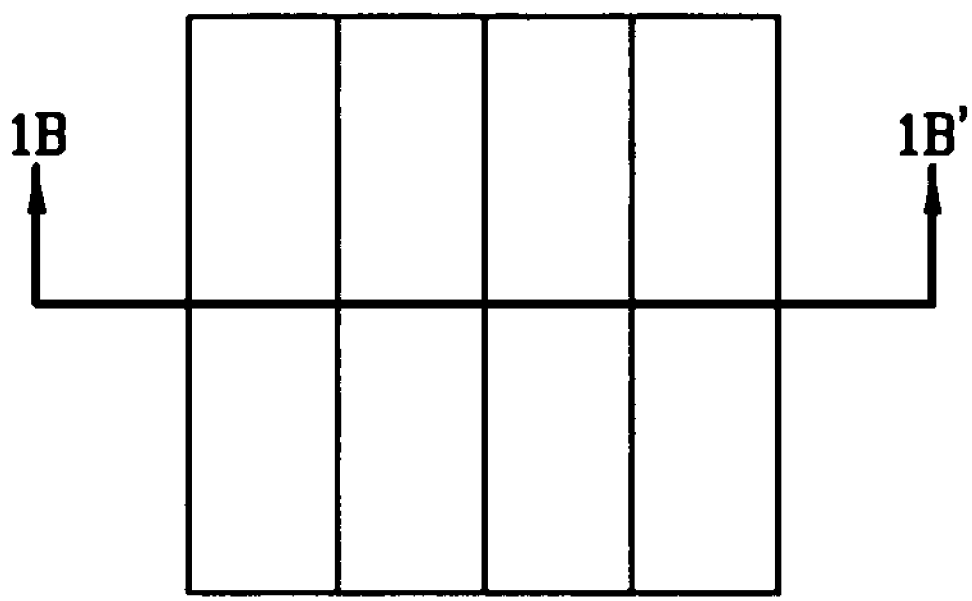
FIG. 1A is a layout view of a micro lens panel unit according to an exemplary embodiment of the present invention.

The present invention will now be described more fully hereinafter with reference to the accompanying drawings, in which preferred embodiments of the invention are shown. This invention may, however, be embodied in many different forms and should not be construed as limited to the embodiments set forth herein.

In the drawings, the thickness of layers and regions are exaggerated for clarity. Like numerals refer to like elements throughout. It will be understood that when an element such as a layer, film, region, substrate, or panel is referred to as being "on" another element, it can be directly on the other element or intervening elements may also be present. In contrast, when an element is referred to as being "directly on" another element, there are no intervening elements present.

Figure 1B:
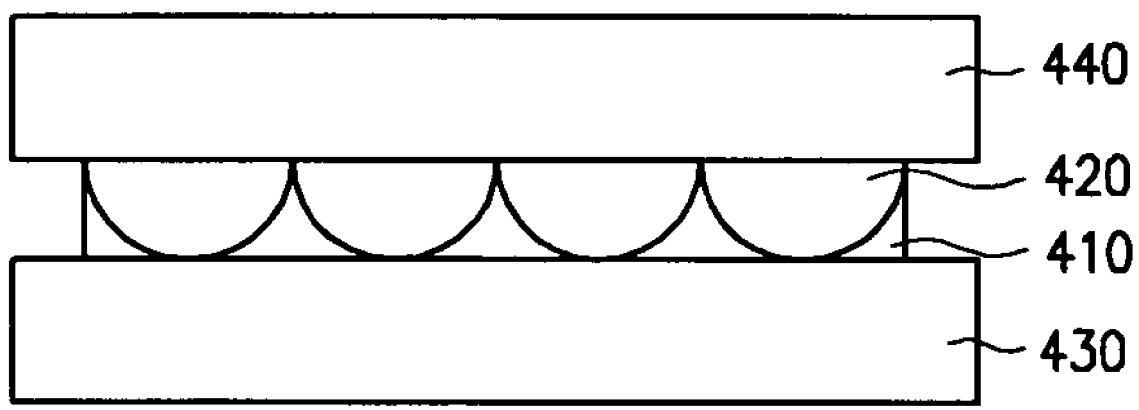
FIG. 1B is a sectional view of the micro lens panel unit shown in FIG. 1A taken along the 1B-1B' line.
Figure 2:
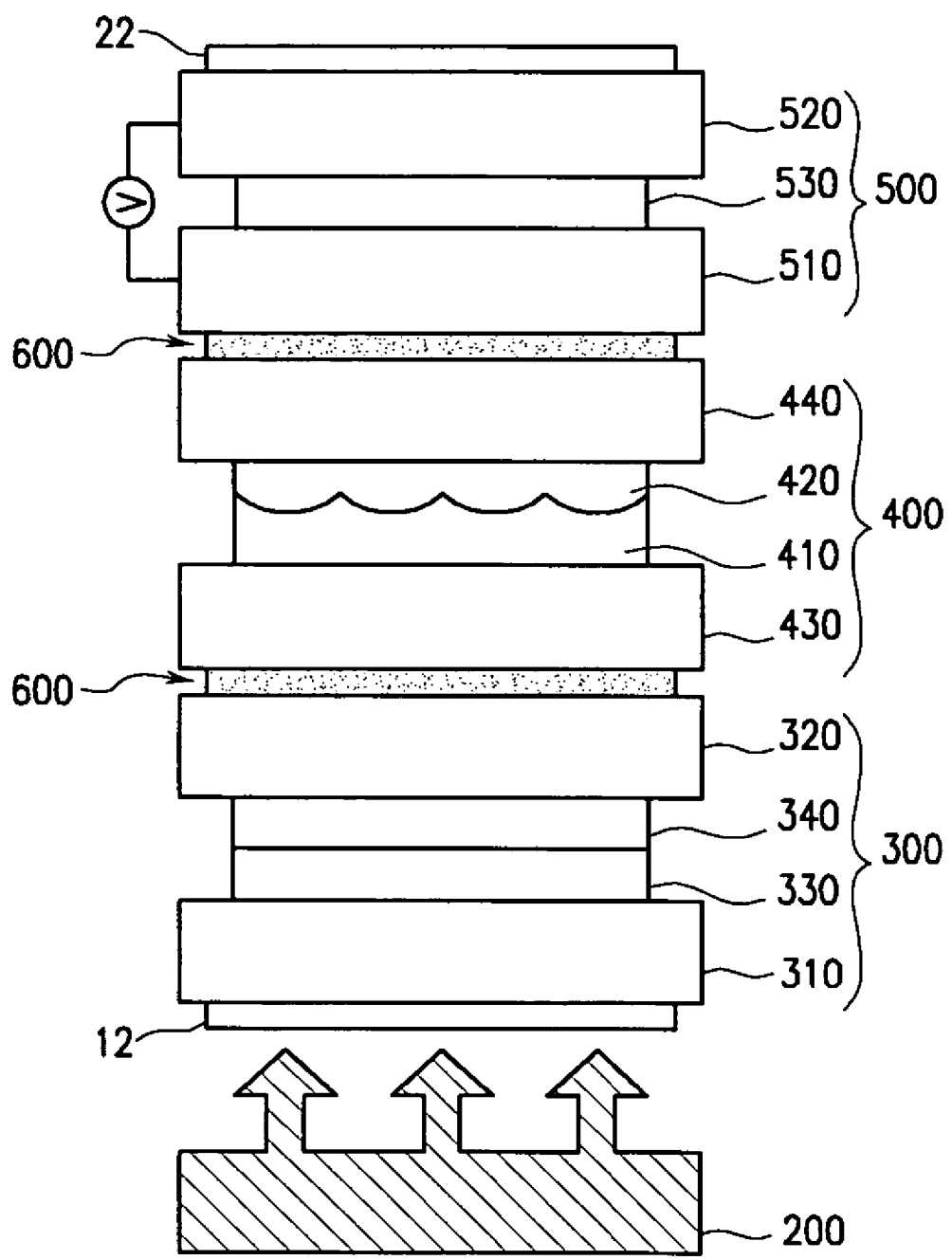
FIG. 2 is a sectional view of a 3D display device including the micro lens panel unit according to an exemplary embodiment of the present invention.

FIG. 1A is a layout view of a micro lens panel unit according to an exemplary embodiment of the present invention, FIG. 1B is a sectional view of the micro lens panel unit shown in FIG. 1A taken along the 1B-1B' line, and FIG. 2 is a sectional view of a 3D display device including the micro lens panel unit according to an exemplary embodiment of the present invention.

Referring to FIGS. 1A-2, a 3D display device according to an exemplary embodiment of the present invention includes a display panel unit 300, a micro lens panel unit 400, a switching panel unit 500, and upper and lower polarizers 22 and 12.

The display panel unit 300 and the micro lens panel unit 400, and the micro lens panel unit 400 and the switching panel unit 500, are combined with adhesive 600, respectively. The lower and upper polarizers 12 and 22 are disposed on the outer surfaces of the display panel unit 300 and the switching panel unit 500, respectively.

Now, the display panel unit 300, which is an image panel unit, will be described in detail.

The display panel unit 300 includes a thin film transistor array panel 310, an upper panel 320, and a liquid crystal layer 330 therebetween.

While not shown, the thin film transistor array panel 310 includes display signal lines such as gate lines and data lines, and a thin film transistor and a pixel electrode formed on each intersection of the gate lines and the data lines. The thin film transistors apply data voltages transmitted via the data lines to the pixel electrodes depending on scanning signals transmitted via the gate lines.

The display panel unit 300 is classified as a transmissive, reflective, or transflective type depending on the pixel electrodes, and any kind of display panel unit is applicable to the 3D display device according to embodiments of the present invention. The transmissive type of display panel unit will be described below in the present embodiment.

The upper panel 320 faces the thin film transistor array panel 310 with a predetermined distance therebetween. The upper panel 320 is provided with a color filter 340, and also, although not shown, it is provided with a black matrix and a common electrode.

The color filter 340 is typically disposed along a pixel row in an order of red, green, and blue.

Liquid crystal material is injected between the thin film transistor array panel 310 and the upper panel 320 to form the liquid crystal layer 330. Alignment states of the liquid crystal include a twisted nematic (TN) mode, an electrically controlled birefringence (ECB) mode, and a vertically aligned (VA) mode, and so on, and the TN mode will be described in the present embodiment. It has a light transmission retarding function by causing a rotation of the polarization axis by 90 degrees in a state in which an electric field is not applied to the liquid crystal.

The micro lens panel unit 400, which is a core for forming a 3D image, will now be described.

The micro lens panel unit 400 plays a part in forming the 3D image by refracting light from the display panel unit 300 to distribute the light toward two eyes.

The micro lens panel unit 400 includes lower and upper panels 430 and 440, a liquid crystal layer 410 therebetween, and a plurality of resin lenses 420 formed on the upper panel 440.

The resin lenses 420 extend in a column direction, respectively, and are arranged in parallel and adjacent to each other in the column direction.

The resin lenses 420 have a shape of a pillar with a curved surface that is sectioned along a perpendicular direction. The pillar with a curved surface includes a cylindrical pillar, an oval pillar, and so on. A position at which the pillar with a curved surface is sectioned along the perpendicular direction is a center of the pillar or a position at a predetermined distance (a distance exceeding 0 and less than half the radius of the pillar) from the center thereof. A resin lens having such a shape is referred to as a convex resin lens 420 hereinafter.

Sectional surfaces of the convex resin lenses 420 are attached to the upper panel 440.

The liquid crystal layer 410 is interposed in a region between and around the resin lenses 420 between the upper panel 440 and the lower panel 430.

The liquid crystal layer 410 has refracting anisotropy, and thus light vibrating in an axial direction (hereinafter referred to as "Y axis direction") of the resin lens 420 is not refracted at the border thereof because the refracting ratio of the liquid crystal layer 410 and the resin lens 420 are seen to be identical. However, light vibrating in a direction perpendicular (hereinafter referred to as "X axis direction") to the axis of the resin lens 420 is refracted at the border thereof because the refracting ratios of the liquid crystal layer 410 and the resin lens 420 are seen to be different. 2D images and 3D images are displayed optionally using such characteristics.

The switching panel unit 500 will now be described in detail.

The switching panel unit 500 plays a part in selecting display of a 2D image or a 3D image.

The switching panel unit 500 includes lower and upper panels 510 and 520, electrodes (not shown) provided with the respective lower and upper panels 510 and 520, and a liquid crystal layer 530 interposed between the lower and upper panels 510 and 520. The mode of the liquid crystal layer 530 may be a TN mode, an ECB mode, or a VA mode.

The TN mode will be described as an example in the present embodiment, which has a light transmission retarding function by causing a rotation of the polarization axis by 90 degrees in a state in which an electric field is not applied to the liquid crystal as described above.

The upper polarizer 22 is disposed on the outer surface of the switching panel unit 500 such that a polarizing light parallel to the axis of the resin lens 420 is absorbed. That is, an absorption axis of the polarizer 22 is a Y axis direction and a transmittance axis thereof is an X axis direction. A direction for the absorption axis of the polarizer 22 is varied depending on whether the display device displays a 2D image or a 3D image in a basic mode in which two electrodes are not applied with voltages. The 2D image is displayed in the basic mode in the present embodiment.

A transmittance axis of the lower polarizer 12 disposed on the outer surface of the display panel unit 300 is also perpendicular to the axis of the resin lens 420. That is, the transmittance axis thereof is an X axis. The transmittance axis of the polarizer 12 is varied depending on whether the 2D image is displayed in a normally white or a normally black state in a state of the liquid crystal layer 300 not being applied with the electric field. As an example, the 2D image is displayed in the normally white state.

Although the embodiment shown in FIG. 2 combines the respective units using the adhesive 600, alternatively, the upper panel 320 of the display panel unit 300 and the lower panel 430 of the micro lens panel unit 400 may be made as one panel, and furthermore, the upper panel 440 of the micro lens panel unit 400 and the lower panel 510 of the switching panel unit 500 may also be made as one panel.

Now, the operation of the 3D display device will be described.

First, display of the 2D image will be described. In this case, the switching panel unit 500 is not applied with voltages (Vs=0, where Vs is a voltage applied to the switching panel unit 500).

When the 2D image is displayed in the normally white state, the liquid crystal layer 330 is not applied with the electric field. Thus, light from a light source 200 having a linearly polarized light only in the X axis direction is passed by the lower polarizer 12, and the light is converted into a linearly polarized light in the Y axis direction as the light passes through the liquid crystal layer 330. The linearly polarized light in the Y axis direction does not recognize the border of the liquid crystal layer 410 and the resin lens 420 of the micro lens panel unit 400 such that it passes through as it is, and is then converted into a linearly polarized light in the X axis direction and passes through the liquid crystal layer 530. Thus, the light is not blocked by the upper polarizer 22 such that it passes through as it is, thereby displaying a white state.

Next, when the 2D image is displayed in the normally black mode, a light passing through the liquid crystal layer 330 is not retarded because of application of an electric field to the liquid crystal layer 330 to change the alignment thereof into a vertical alignment. In this way, a light from the light source 200 having a linearly polarized light only in an X axis direction is passed by the lower polarizer 12, and then the light passes through the liquid crystal layer 330 without being blocked and is then refracted by the micro lens panel unit 400 to be distributed toward two eyes. The distributed light is still the linearly polarized light in the X axis direction and thus passes through the liquid crystal layer 530 of the switching panel unit 500 to be converted into a linearly polarized light in a Y axis direction. This light is blocked by the upper polarizer 22, thereby displaying a black state.

Display of a 3D image will now be described. In this case, a light passing through the liquid crystal layer 530 of the switching panel unit 500 is not retarded because of the electric field applied to the liquid crystal layer 530 to change the alignment thereof into a vertical alignment.

When the 3D image is displayed in the normally white mode, a light passing through the liquid crystal layer 330 is also not retarded because of the electric field applied to the liquid crystal layer 300 to change the alignment thereof into a vertical alignment. In this way, light from the light source 200 having a linearly polarized light only in an X axis direction is passed by the lower polarizer 12, and then the light passes through the liquid crystal layer 330 without being blocked thereby and is then refracted by the micro lens panel unit 400 to be distributed toward two eyes. The distributed light is still the linearly polarized light in the X axis direction and thus it passes through the liquid crystal layer 530 of the switching panel unit 500 as it is. This light is not blocked by the upper polarizer 22, thereby displaying a white state.

When the 3D image is displayed in the normally black mode, the liquid crystal layer 330 of the display panel unit 300 is not applied with an electric field. Thus, light from the light source 200 having a linearly polarized light only in the X axis direction is passed by the lower polarizer 12, and the light is converted into a linearly polarized light in the Y axis direction and passes through the liquid crystal layer 330. The linearly polarized light in the Y axis direction does not recognize the border of the liquid crystal layer 410 and the resin lens 420 of the micro lens panel unit 400 so it passes through as it is, and then passes through the liquid crystal layer 530 while remaining as the linearly polarized light in the Y axis direction. Thus, the light is blocked by the upper polarizer 22, thereby displaying a black state.

Now, an arranging method of the 3D display device with such structure will be described.

First, the display panel unit 300, the micro lens panel unit 400, the switching panel unit 500, and the polarizers 12 and 22 are provided.

Subsequently, the display panel unit 300 and the micro lens panel unit 400 are combined using the adhesive 600. At this time, the display panel unit 300 and the micro lens panel unit 400 are arranged accurately with each other. For the panel shown in FIG. 2, pixels (not shown) of the display panel unit 300 are accurately arranged so that a group comprising an even number of pixel columns overlaps the lens of the micro lens panel unit 400.

Next, the switching panel unit 500 is attached to the other side of the micro lens panel unit 400 that is not attached with the display panel unit 300 using the adhesive 600. This does not require specific arrangement. The switching panel unit 500 might be omitted in other embodiments.

Last, the polarizers 12 and 22 are attached.

The combining of the display panel unit 300 and the micro lens panel unit 400 using the adhesive 600 will now be described in detail.

A combining apparatus is required for arrangement of the display panel unit 300 and the micro lens panel unit 400, and an ultraviolet (UV) ray-cured adhesive is coated on either of the surface of the upper panel 320 of the display panel unit 300 or the surface of the lower panel 430 of the micro lens panel unit 400 for attaching them to each other.

The attached panel units 300 and 400 are watched using a camera while voltages are applied to the display panel unit 300 such that the entire display panel unit 300 displays a 3D image in a white state. The lower polarizer 12 is disposed on the outer surface of the display panel unit 300. The lower polarizer 12 may be provided on the combining apparatus.

A black striped image on a white background is displayed to the camera. Relative positions of the display panel unit 300 and the micro lens panel unit 400 are shifted such that the black stripes are displayed at centers of each of the left and right of the display panel unit 300. The first arrangement is completed when the black stripes are displayed accurately in a longitudinal direction at each center of the left and right of the panel unit 300.

Next, the panel units 300 and 400 are watched using the camera while voltages are applied to the panel unit 300 such that even pixel columns display a white state and odd pixel columns display a black state. White is displayed on one side and black is displayed on the other side with respect to a black stripe at the center on the camera. When the positions of the white and black are in accordance with predetermined positions, the second arrangement is completed, but otherwise, the relative positions of the panel unit 300 and 400 are shifted until the positions thereof are in accordance with the predetermined positions.

After completing the first and second arrangements, the UV ray is illuminated on the adhesive 600 for curing to attach the panel units 300 and 400 together.

Principles for the first and second arrangements will be described with reference to FIGS. 3 and 4.

Figure 3:
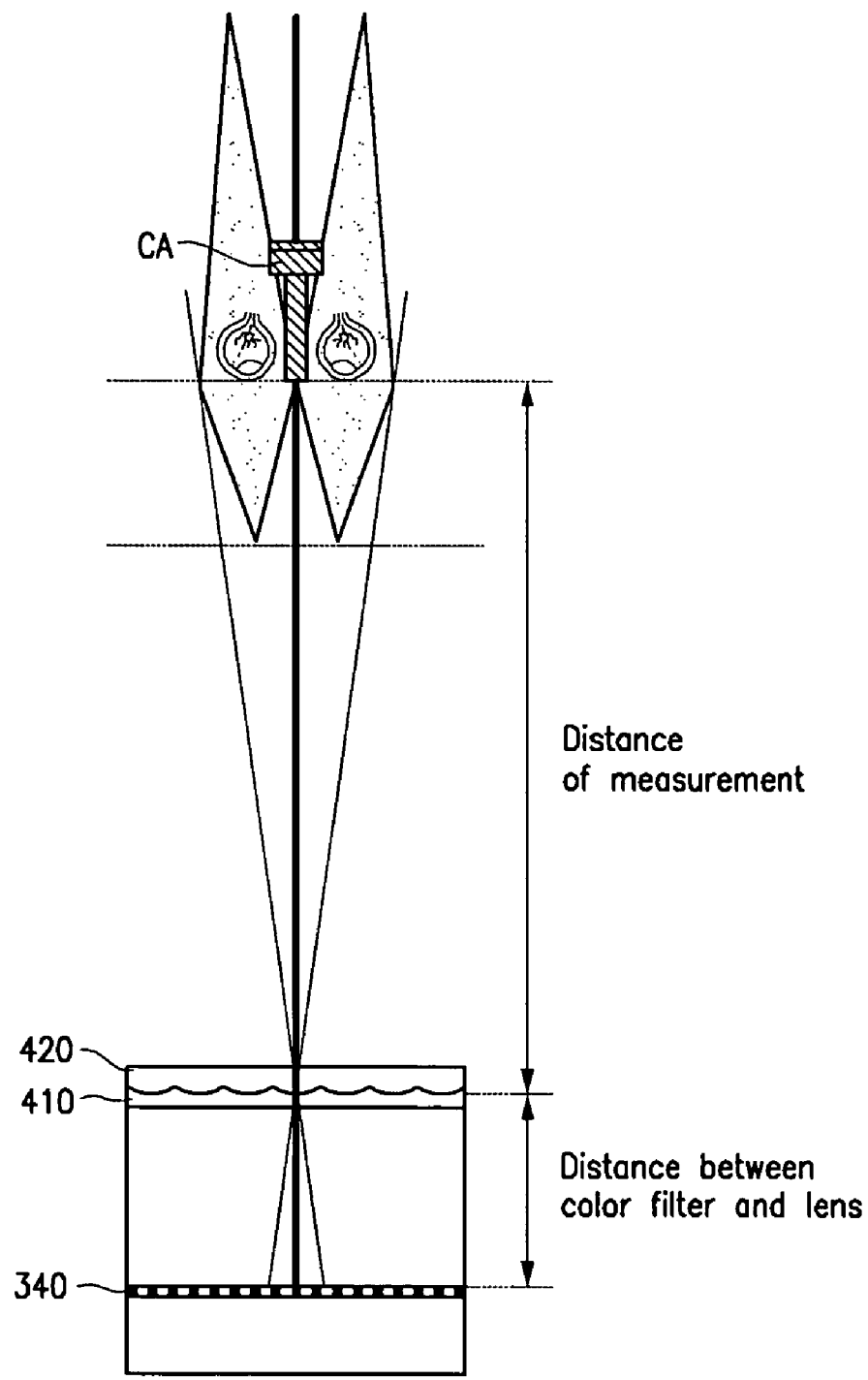
FIG. 3 is a drawing to illustrate a test principle for an arrangement state of an image panel and a 3D image formation apparatus in a manufacturing method of a 3D display device according to an exemplary embodiment of the present invention.
Figure 4:
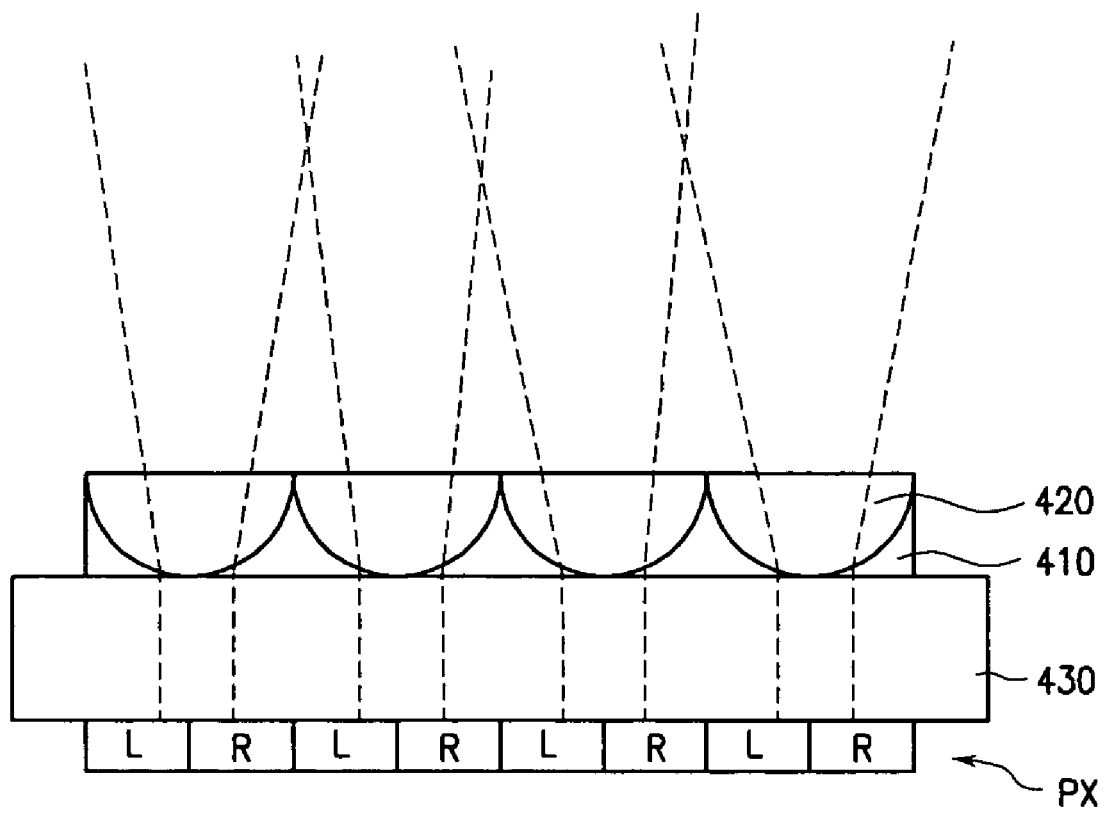
FIG. 4 shows an arrangement state of a micro lens panel and a display panel.

FIG. 3 is a drawing to illustrate a test principle for an arrangement state of a display panel unit and a micro lens panel unit in a manufacturing method of a 3D display device according to an exemplary embodiment of the present invention, and FIG. 4 shows an arrangement state of a micro lens panel and a display panel.

First, the first arrangement of adjusting the position of the black stripe will be described.

In the 3D display device using the lens, light from two pixel adjacent columns is refracted by the lens to be distributed toward two eyes with one lens. This causes parallax of two eyes such that viewers perceive a 3D image. As shown in FIG. 3, of the light from two pixel columns, the light from one pixel column directs toward the right eye and the light from the other pixel column directs toward the left eye, and thus there is no light traveling toward a point between the two eyes. Accordingly, the camera CA is disposed at a position corresponding to the center of the two eyes to photograph the panel units 300 and 400. Then, the portion in which there is no light traveling is shown as a black stripe. The black stripe is displayed in a longitudinal direction at the right center when the lens and two pixel columns are arranged accurately.

Now, the second arrangement will be described with reference to FIG. 4.

After completion of the first arrangement, the display panel unit 300 and the micro lens panel unit 400 may have two arrangement states. For example, it is not confirmed whether a pixel PX outputting light directed toward the right eye, of two pixels arranged for one lens, is disposed at the left or the right of the lens 420. When the pixel PX outputting the light directed toward the right eye is disposed as shown in FIG. 4, a 3D image is displayed normally, but otherwise, the 3D is reversely displayed. Thus, the arrangement state is required to be adjusted to be like that shown in FIG. 4.

For this, when voltages are applied such that even pixel columns display a white color and odd pixel columns display a black color, the light from the odd pixel columns is refracted toward the left and the light from the even pixel columns is refracted toward the right. At this time, viewing via the camera CA, a white color is shown in the left side and a black color is shown in the right side with respect to the black stripe. Which side the white color is shown in the normal state depends on design choice.

Figure 5:
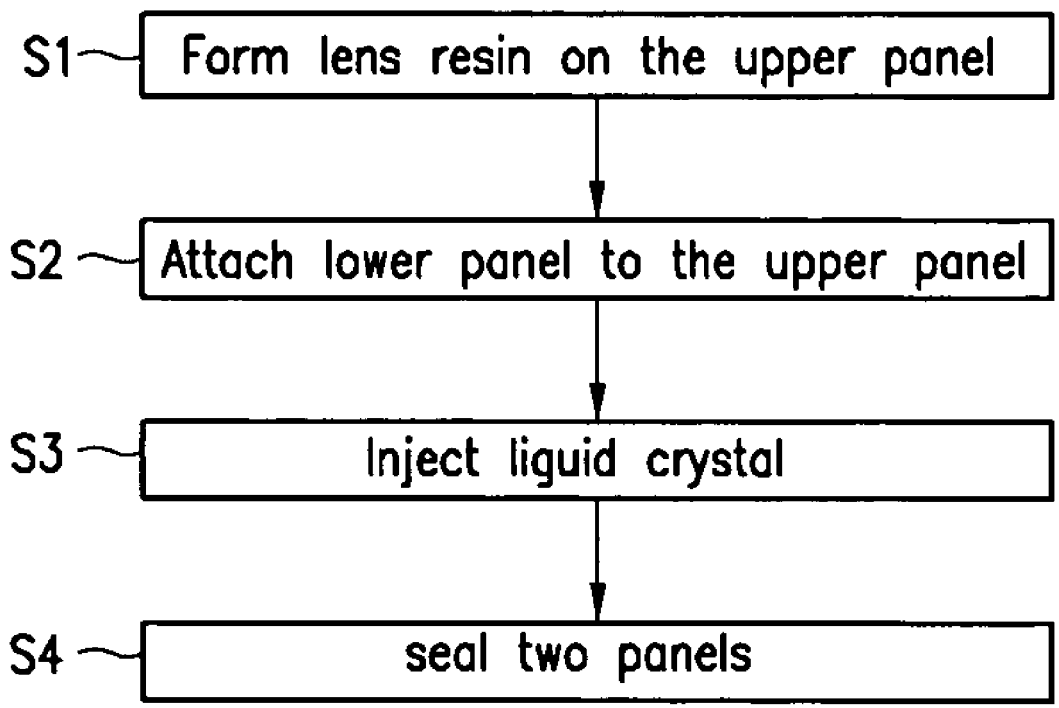
FIG. 5 is a flow chart to illustrate a manufacturing method of a micro lens panel for a 3D display device according to an exemplary embodiment of the present invention.

FIG. 5 is a flow chart to illustrate a micro lens panel unit for a 3D display device according to an exemplary embodiment of the present invention.

First, the convex resin lens 420 is formed on the upper panel 440 of the micro lens panel unit 400 using resin (S1).

The convex resin lens 420 is shaped as a pillar with a curved surface sectioned along a perpendicular direction. The pillar with a curved surface includes a cylinder, an oval pillar, and so on. A position at which the pillar with a curved surface is sectioned along the perpendicular direction is a center of the pillar or a position at a predetermined distance (a distance exceeding 0 and less than half the radius of the pillar) from the center thereof.

A plurality of the convex resin lenses 420 are arranged parallel to each other in a row direction. Additionally, sectional sides of the convex resin lenses 420 are attached to the upper panel 440.

Then, the upper panel 440 attached with the resin lenses 420 is attached to the lower panel 430 (S2). A sealant is formed at the peripheral area of the upper panel 400 to attach the two panels 430 and 440 together, and is provided with an injection hole for injecting the liquid crystal 410.

Subsequently, the liquid crystal 410 is injected via the injection port (S3). The injected liquid crystal is filled in the regions around the resin lenses 420. Then, the injection hole is sealed after filling with the liquid crystal (S4).

As described above, the resin lenses 420 are shaped convexly and thus pitches between the resin lenses are formed to be sharp, and the pitches are not smoothed by a load of the upper panels.

While the present invention has been described in detail with reference to the preferred embodiments, it is to be understood that the invention is not limited to the disclosed embodiments, but, on the contrary, is intended to cover various modifications and equivalent arrangements included within the sprit and scope of the appended claims.

What is claimed is:

1. A micro lens panel unit for a 3D display device, comprising:
   a first panel;
   resin lenses formed on the first panel and having a convex shape;

a second panel facing the first panel; and liquid crystal interposed between the resin lenses and the second panel, and aligned in one direction regardless of applied voltages, wherein the convex shape of the resin lenses has a top contacting the second panel; and wherein the resin lenses comprise an isotropic material.

2. The micro lens panel unit of claim 1, wherein the resin lenses substantially extend in a column direction and are disposed parallel to each other in a row direction, and are shaped as pillars with a curved surface such as cylindrical pillars and oval pillars that are sectioned along a perpendicular direction thereof, and sectional surfaces of the resin lenses are attached to the first panel.

3. The micro lens panel unit of claim 2, wherein a position at which the pillars with a curved surface are sectioned along the perpendicular direction is a center of the pillars or a position at a distance exceeding 0 and less than half the radius of the pillars.

4. A 3D display device comprising:

a display panel unit; and a micro lens panel unit comprising a first panel, resin lenses formed on the first panel and having a convex shape, a second panel facing the first panel, and liquid crystal interposed between the resin lenses and the second panel, wherein the convex shape of the resin lenses has a top contacting the second panel, wherein the liquid crystal is aligned in one direction regardless of applied voltages, and wherein the resin lenses comprise an isotropic material.

5. The 3D display device of claim 4, wherein the resin lenses substantially extend in a column direction and are disposed parallel to each other in a row direction, and are shaped as pillars with a curved surface such as cylindrical pillars and oval pillars that are sectioned along a perpendicular direction thereof, and sectional surfaces of the resin lenses are attached to the first panel.

6. The 3D display device of claim 5, wherein a position at which the pillars with a curved surface are sectioned along the perpendicular direction is a center of the pillars or a position at a distance exceeding 0 and less than half the radius of the pillars.

7. The 3D display device of claim 4, wherein the display panel unit comprises a plurality of pixels arranged in a matrix, and two pixel columns are arranged for each resin lens.

8. The 3D display device of claim 7, further comprising a backlight unit providing light for the pixels, wherein light from a pixel disposed at the left of the resin lens directs toward a left eye and light from a pixel disposed at the right of the resin lens directs towards a right eye.

9. A manufacturing method of a micro lens panel unit for a 3D display device, comprising:

forming a plurality of resin lenses each having a convex shape on an upper panel using resin comprising an isotropic material;

attaching a lower panel to the upper panel using a sealant;

injecting liquid crystal between the resin lenses and the lower panel, and aligning the liquid crystal in one direction regardless of applied voltages; and sealing the two panels, wherein the convex shape of the resin lenses has a top contacting the lower panel.

10. The manufacturing method of claim 9, wherein the resin lenses substantially extend in a column direction and are disposed parallel to each other in a row direction, and are shaped as pillars with a curved surface such as cylindrical pillars and oval pillars that are sectioned along a perpendicular direction thereof, and sectional surfaces of the resin lenses are attached to the upper panel.

11. The manufacturing method of claim 10, wherein a position at which the pillars with a curved surface are sectioned along the perpendicular direction is a center of the pillars or a position at a distance exceeding 0 and less than half the radius of the pillars.

12. The manufacturing method of claim 9, wherein the sealant has an injection hole for injection the liquid crystal.

13. The micro lens panel unit of claim 1, wherein a sectional surface of the convex shape contacts the first panel, and a distal end of the convex shape contacts the second panel.

* * * * *